United States Patent
Tigue et al.

(10) Patent No.: US 10,611,232 B2
(45) Date of Patent: Apr. 7, 2020

(54) FINAL DRIVE MOUNTED MOTOR FOR TRACK-TYPE TRACTOR

(71) Applicant: Caterpillar Inc., Deerfield, IL (US)

(72) Inventors: Joseph D. Tigue, Peoria, IL (US); Timothy J. Schlack, Washington, IL (US); Jonathan M. Baumann, Hanna City, IL (US); Gregory Austin, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/117,368

(22) Filed: Aug. 30, 2018

(65) Prior Publication Data

US 2020/0070644 A1 Mar. 5, 2020

(51) Int. Cl.
*B60K 7/00* (2006.01)
*B62D 55/06* (2006.01)

(52) U.S. Cl.
CPC ............ *B60K 7/0007* (2013.01); *B62D 55/06* (2013.01); *B60K 2007/0038* (2013.01); *B60K 2007/0092* (2013.01)

(58) Field of Classification Search
CPC ............ B60K 7/007; B60K 2007/0092; B60K 7/0007; B62D 55/06; B60Y 2200/25; B60Y 2200/411
See application file for complete search history.

(56) References Cited

U.S. PATENT DOCUMENTS

| 4,554,989 | A | * | 11/1985 | Gruich | B60K 3/04 180/65.245 |
| 5,829,542 | A | * | 11/1998 | Lutz | B60K 1/02 180/65.6 |
| 6,231,136 | B1 | * | 5/2001 | Freeman | B62D 25/16 305/107 |
| 6,260,465 | B1 | | 7/2001 | Zonak et al. | |
| 6,527,072 | B1 | | 3/2003 | Schlegl et al. | |
| 7,231,993 | B2 | * | 6/2007 | Albright | B62D 55/096 180/9.5 |
| 7,309,300 | B2 | | 12/2007 | Garnett et al. | |
| 7,950,481 | B2 | | 5/2011 | Betz et al. | |
| 8,356,680 | B2 | | 1/2013 | Jackson | |

(Continued)

FOREIGN PATENT DOCUMENTS

| EP | 2340954 A2 | 7/2011 |
| EP | 2366604 B1 | 10/2012 |

(Continued)

*Primary Examiner* — Brian L Swenson
(74) *Attorney, Agent, or Firm* — Calfee, Halter & Griswold LLP

(57) ABSTRACT

A track-type tractor includes a frame housing defining an internal cavity extending to an outer bore, an electric motor module, and a final drive assembly. The electric motor module includes a motor housing having a flanged end portion, and a rotor shaft extending through the flanged end portion. The flanged end portion is mounted to a outer mounting surface of the frame housing surrounding the outer bore, such that the electric motor module extends through the outer bore and is retained within the frame housing internal cavity. The final drive assembly is mounted to the flanged end portion and includes a gear set in operative engagement with the rotor shaft for motorized operation of the final drive assembly.

20 Claims, 4 Drawing Sheets

(56) References Cited

U.S. PATENT DOCUMENTS

| | | | |
|---|---|---|---|
| 8,544,579 B2* | 10/2013 | Kabrick | B60K 7/0007 |
| | | | 180/65.51 |
| 8,606,456 B2 | 12/2013 | Nordberg | |
| 9,546,654 B2* | 1/2017 | Rabhi | F16C 33/306 |
| 9,676,411 B2 | 6/2017 | Tigue et al. | |
| 10,294,634 B2* | 5/2019 | Tigue | E02F 9/207 |
| 2009/0283345 A1 | 11/2009 | Kabrick et al. | |
| 2012/0217080 A1 | 8/2012 | Besler et al. | |
| 2012/0217788 A1* | 8/2012 | Vallejo | B60K 7/0007 |
| | | | 301/6.5 |
| 2012/0217793 A1 | 8/2012 | Drum et al. | |
| 2016/0096548 A1 | 4/2016 | Tigue et al. | |
| 2016/0096563 A1 | 4/2016 | Tigue et al. | |
| 2016/0097185 A1 | 4/2016 | Tigue et al. | |

FOREIGN PATENT DOCUMENTS

| | | |
|---|---|---|
| KR | 20100137003 | 12/2010 |
| TW | M274096 U | 9/2005 |
| WO | 2017106620 | 6/2017 |

\* cited by examiner

FINAL DRIVE MOUNTED MOTOR FOR TRACK-TYPE TRACTOR

TECHNICAL FIELD

The present disclosure generally relates to an electric motor module, and more particularly relates to a frame-mounted electric motor module for a tracked work machine.

BACKGROUND

An electric drive may be used as source of driving power in a vehicle, such as, for example, an off-road tracked work machine (e.g., track-type tractor), a highway truck, or an automobile. An electric drive may supplement the driving power provided by an internal combustion engine or the electric drive may provide all of the driving power for the vehicle. Using an electric drive to supplement or replace the internal combustion engine may reduce the emissions generated during the operation of the vehicle. In addition, the electric drive may increase the fuel efficiency of the vehicle. In operation, electric drive motors typically generate an output torque which is transferred to ground engaging components on a machine—such as tracks on a track-type tractor—using a final drive arrangement.

Some machines, such as track-type tractors, generally include a differential steering arrangement that is disposed between the electric motor and the ground engaging devices on the machine. The differential steering arrangement is operable to change relative speeds of the ground engaging devices in order to steer the machine. For example, U.S. Patent Application Pub. No 2016/0096563 describes an electric drive retrofit kit including an electric motor module installable in a frame housing and operatively connected to frame housing mounted final drive assemblies by planetary gear assemblies which provide for differential steering of the track-type tractor by allowing for adjustment or the rotational speeds of the final drive assemblies relative to each other.

In other embodiments, plural drive motors may be provided for individually driving opposite ground engaging devices. For example, U.S. Pat. No. 7,309,300 describes an electric drive system for a tracked work machine having multiple electric motors. However, space requirements for the individual motors and drives are high, and may limit the ability to retrofit or otherwise utilize a frame housing originally sized and configured for a comparable mechanical powertrain.

The foregoing background discussion is intended solely to aid the reader. It is not intended to limit the innovations described herein, nor to limit or expand the prior art discussed. Consequently, the foregoing discussion should not be taken to indicate that any particular element of a prior system is unsuitable for use with the innovations described herein, nor is it intended to indicate that any element is essential in implementing the innovations described herein. The implementations and application of the innovations described in the disclosure are defined by the appended claims.

SUMMARY OF THE DISCLOSURE

An exemplary track-type tractor includes a frame housing defining an internal cavity extending to a first outer bore, a first electric motor module, and a first final drive assembly. The first electric motor module includes a first motor housing having a first flanged end portion, and a first rotor shaft extending through the first flanged end portion. The first flanged end portion is mounted to a first outer mounting surface of the frame housing surrounding the first outer bore, such that the first electric motor module extends through the first outer bore and is retained within the frame housing internal cavity. The first final drive assembly is mounted to the first flanged end portion and includes a gear set in operative engagement with the first rotor shaft for motorized operation of the first final drive assembly.

In an exemplary method of installing an electric drive system in a frame housing of a track-type tractor, a first motor housing of a first electric motor module is inserted through a first outer bore in the frame housing, such that the first motor housing extends into an internal cavity of the frame housing, and a first rotor shaft of the first electric motor module extends outward of the frame housing. A first flanged end portion of the first motor housing is mounted to a first outer mounting surface of the frame housing surrounding the first outer bore. A first final drive assembly is mounted to the first flanged end portion, such that the first final drive assembly is in operative engagement with the first rotor shaft for motorized operation of the first final drive assembly.

An exemplary electric drive system retrofit kit for a track-type tractor includes an electric motor module and a final drive assembly. The electric motor module includes a motor housing having a flanged end portion, and a rotor shaft extending through the flanged end portion, the flanged end portion including a first set of mounting holes disposed around an outer periphery. The final drive assembly includes a mounting flange and a gear set, with the mounting flange including a second set of mounting holes sized and positioned to align with the first set of mounting holes when the rotor shaft is engaged with the gear set, such that mounting fasteners installed through the aligned first and second sets of mounting holes may be installed in corresponding mounting holes in an exterior wall of the track-type tractor for mounted installation of the electric motor module and the final drive assembly with the track-type tractor.

Other features and aspects of this disclosure will be apparent from the following description and the accompanying drawings.

DETAILED DESCRIPTION

The present disclosure relates to a mounting arrangement for an electric drive system for a tracked work machine, including an electric motor module having a flanged end configured to be secured to an outer mounting surface of a frame housing. Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein are made collectively or individually when there may be more than one element of the same type. However, such references are merely exemplary in nature. Accordingly, it may be noted that any such reference to elements in the singular is also to be construed to relate to the plural and vice-versa without limiting the scope of the disclosure to the exact number or type of such elements unless set forth explicitly in the appended claims.

The Detailed Description describes exemplary embodiments and is not intended to limit the scope of the claims in any way. Indeed, the claimed invention is broader than and unlimited by the exemplary embodiments, and the terms used in the claims have their full ordinary meaning. Features and components of one exemplary embodiment may be incorporated into the other exemplary embodiments. Inventions within the scope of this disclosure may include additional features, or may have less features, than those shown in the exemplary embodiments.

Figure 1:
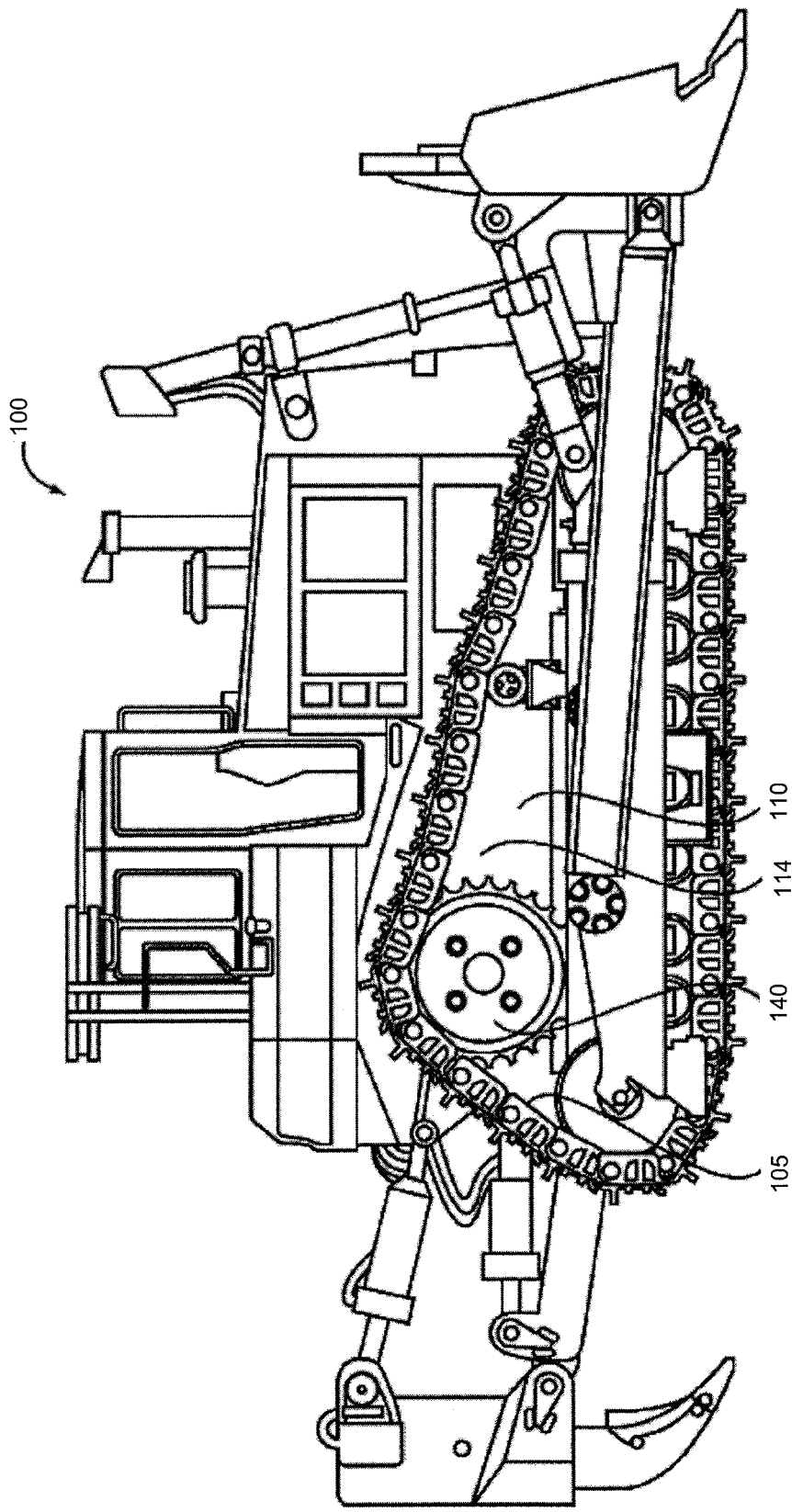
FIG. 1 is a side view of a track-type tractor, according to an exemplary embodiment of the present disclosure.

FIG. 1 illustrates a tracked work machine 100, for example, a track-type tractor, that includes a frame housing 110 that encloses a power source, for example, an electric powertrain, as described in greater detail below. A final drive assembly 140 is attached to each side 114 of the frame housing 110 to engage and supports a corresponding track chain 105 (or other such track-type ground engaging member). As well known in the art, the track-type tractor 100 is propelled by movement of the track chains 105 driven by rotation of the final drive assemblies 140.

Figure 2:
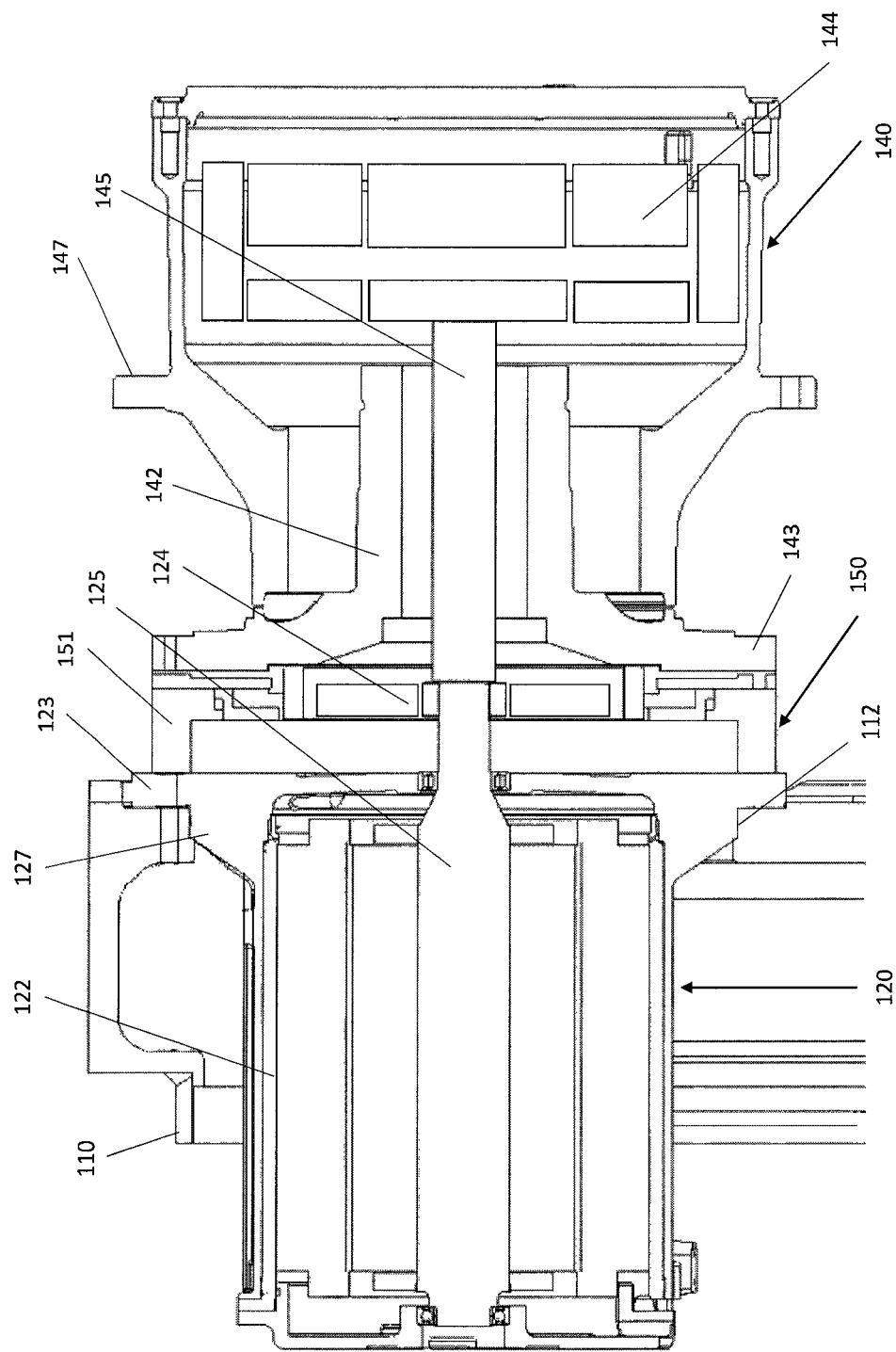
FIG. 2 is a cross-sectional view of an electric motor module and final drive assembly externally mounted on a frame housing of a track-type tractor, according to an exemplary embodiment of the present disclosure.
Figure 3:
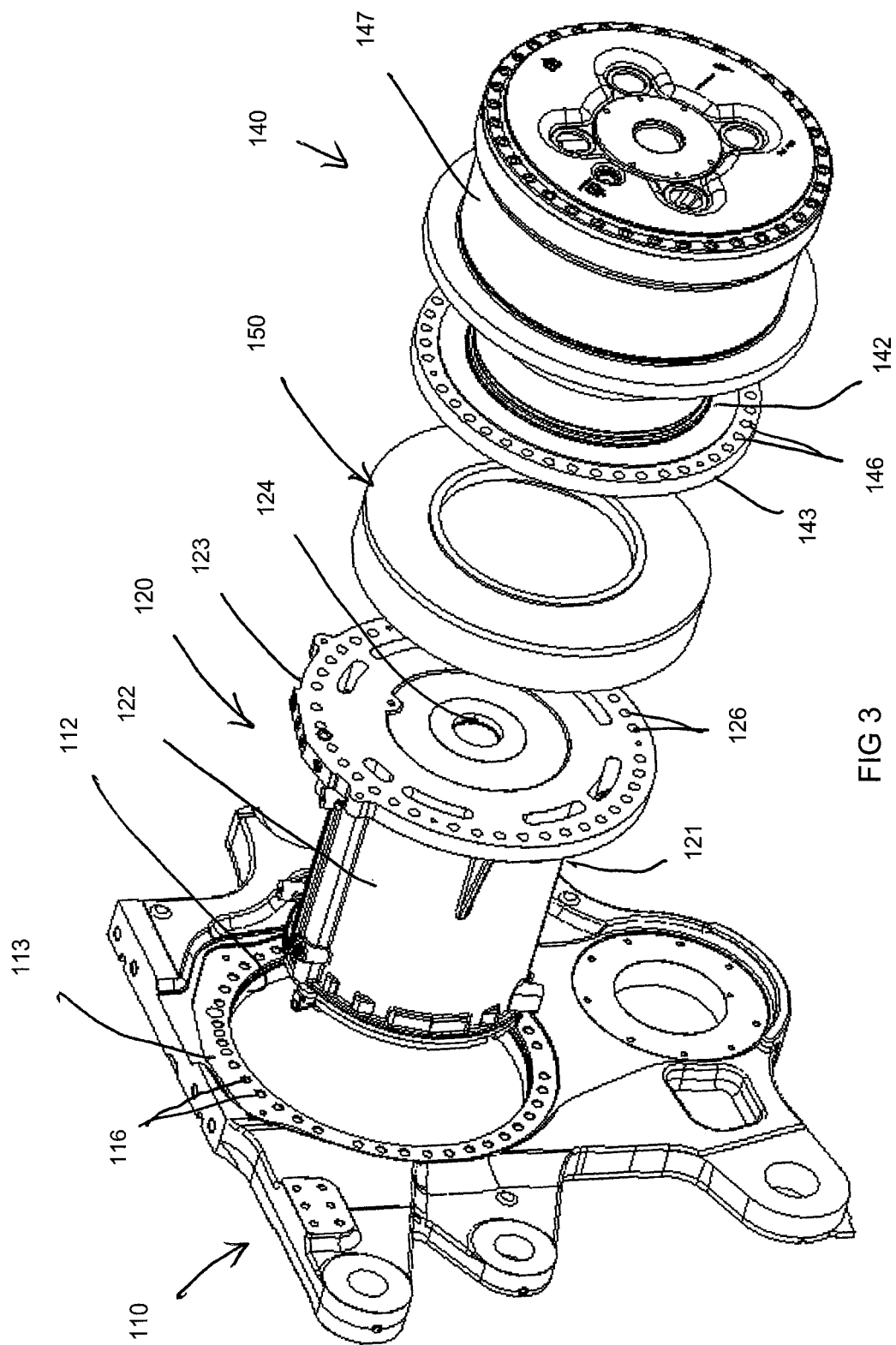
FIG. 3 is an exploded perspective view of the assembly of FIG. 2.

Referring to the partial cross-sectional view of FIG. 2 and the exploded perspective view of FIG. 3, an exemplary track-type tractor 100 includes at least one electric motor module 120 and final drive assembly 140 externally mounted on a frame housing 110. The electric motor module 120 includes a housing 121 having a substantially cylindrical body portion 122 and a flanged end portion 123. The body portion 122 is sized to be received in an internal cavity of the frame housing 110 through a final drive bore or outer bore 112 in the side of the frame housing, and the flanged end portion 123 is sized to abut an outer mounting surface 113 of the frame housing surrounding the final drive bore 112. Mounting holes 126 disposed on a periphery of the flanged end portion may be sized and positioned to align with corresponding mounting holes 116 in the outer mounting surface 113, for mounting of the motor module 120 to the frame housing 110 using mounting fasteners (e.g., bolts). As shown, the motor module housing 121 may be provided with an enlarged shoulder portion 127 behind the flanged end portion 123 to provide close fit or press fit engagement between the motor module housing 121 and the final drive bore 112.

The portion of the motor module 120 disposed outside of the frame housing 110 may depend on the thickness of the flanged end portion 123. While the illustrated flanged end portion 123 is relatively thin, a thicker or axially enlarged flanged end portion may be provided to locate a larger portion of the motor module outside the frame housing, thereby reducing the space occupied by the motor module within the frame housing. Alternatively, a spacer may be installed between the flanged end portion and the outer mounting surface of the frame housing to locate a larger portion of the motor module outside the frame housing.

A rotor shaft 125 in the motor module housing 121 extends beyond the flanged end portion 123 for operative rotational connection with final drive assembly 140, for driving external sprocket 147. In the illustrated example, the rotor shaft 125 engages gear set 124 which makes rotational connection with output shaft 145 in the final drive assembly, which in turn connects with gear set 144. The final drive assembly 140 includes a supporting spindle 142 having a mounting flange 143 sized to align with the flanged end portion 123 of the motor module housing 121, and may have mounting holes 146 sized and positioned to align with the mounting holes 116, 126 in the frame housing and motor module flanged end portion 123, such that a single set of fasteners may be used to mount both the motor module 120 and the final drive assembly 140 to the frame housing 110. While the mounting flange 143 of the final drive assembly 140 may be mounted directly to, or in direct engagement with, the flanged end portion 123 of the motor module housing 121, in the illustrated embodiment, a brake assembly 150, operable to reduce rotational speed of the rotor shaft 125, is clamped between the flanged end portion 123 of the motor module housing 121 and the mounting flange 143 of the final drive assembly 140, to receive and operatively engage adjoining ends of the rotor shaft 125 and output shaft 145.

Figure 4:
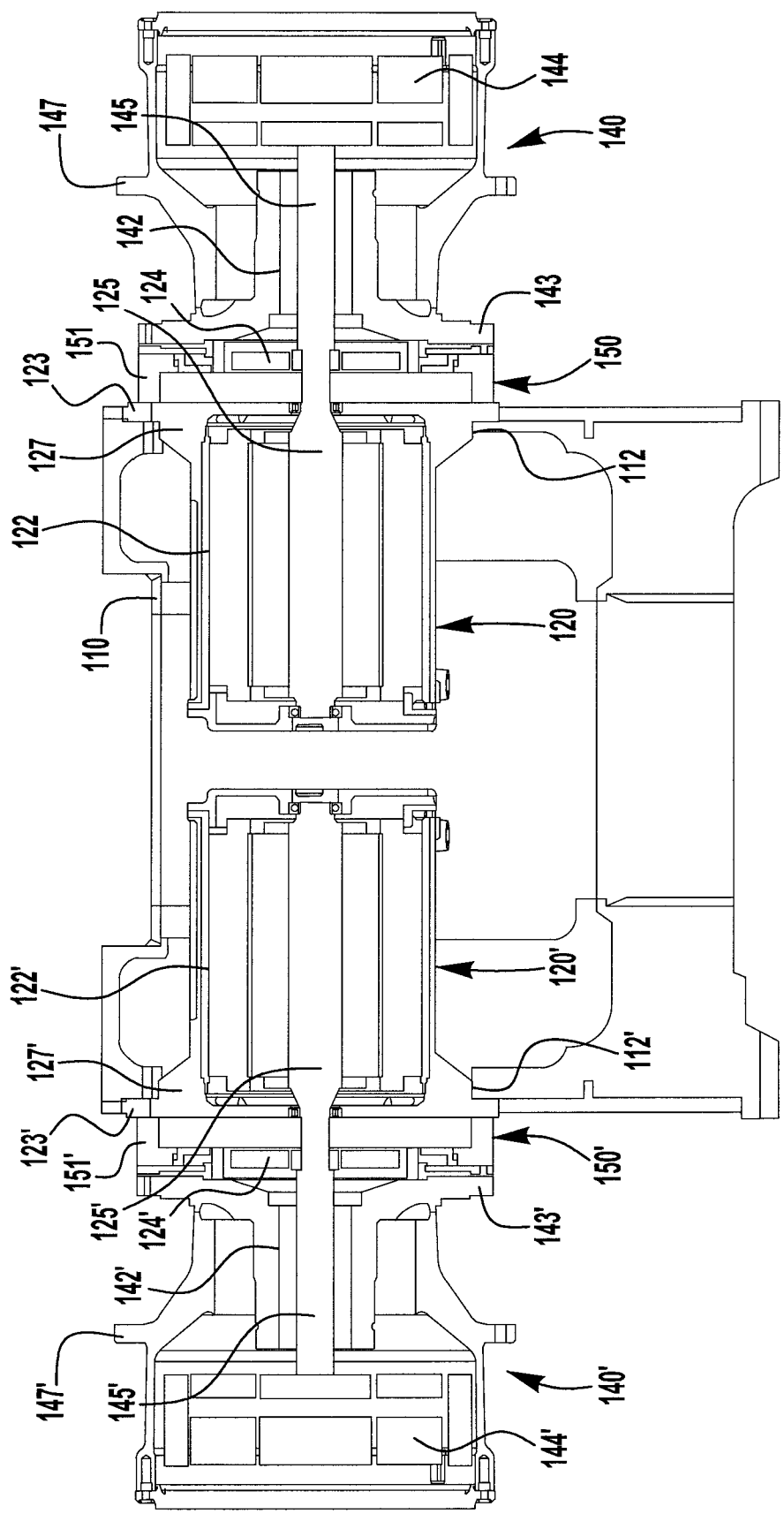
FIG. 4 is a cross-sectional view of an electric drivetrain system including two electric motor modules and final drive assemblies externally mounted on a frame housing of a track-type tractor, according to an exemplary embodiment of the present disclosure.

As illustrated in the cross-sectional view of FIG. 4, the track-type tractor 100 may include an electric drivetrain system having two electric motor modules 120, 120', brake assemblies 150, 150', and final drive assemblies 140, 140' externally mounted on the frame housing 110. The second motor module 120', brake assembly 150', and final drive assembly 140' may be constructed and mounted in substantially the same manner as the first motor module 120, brake assembly 150, and final drive assembly 140, as described in greater detail above.

As shown, the housing body portions 122, 122' of the motor modules 120, 120' may be substantially unsupported within the frame housing 110, such that the motor modules are secured in a cantilevered condition within the frame housing by attachment of the flanged end portions 123, 123' to the frame housing outer mounting surface 113. In other embodiments (not shown), the body portions 122, 122' of either or both of the motor modules 120, 120' may be supported by a portion of the frame housing 110 or by the other motor module (e.g., by a bracket attaching the body portions).

INDUSTRIAL APPLICABILITY

The mounting arrangements of the present disclosure have applicability for implementation and use in industrial settings such as mining, agriculture, and construction. The technology described may provide for electrically driven track-type tractors, both as initially constructed and as retrofitted from an original mechanically driven track-type tractor, and may also be applied to other work machines (e.g., wheel loaders, motor graders, excavators, articulated trucks, pipelayers, backhoes, bulldozers), on- or off-highway trucks, or automobiles.

The work machine frame housing 110 may be configured to accommodate either mechanical or electric powertrain assemblies. For example, at the time of assembly, the same frame housing may be used to construct mechanically and electrically driven work machines by selecting and installing the corresponding powertrain assembly, thereby reducing construction and inventory costs. As another example, an existing mechanically driven work machine may be retrofitted with an electric powertrain assembly for conversion of the work machine to an electrically driven work machine.

While a single electric motor of a conventional electric drive system may be sized to fit entirely within a frame housing of a conventional mechanically driven work machine, for other electric drive system arrangements, including multiple motor drive systems, the overall size or shape of the electric drive system prevents the electric system from fitting into the same space as the mechanical transmission being replaced. For example, the full enclosure of multiple, independently operable electric motor modules (e.g., provided to eliminate the need for differential steering gear arrangements, for example, for increased motor efficiency) within a conventionally sized work machine frame housing may be limited or prevented by space constraints within the frame housing. By externally mounting a flanged end portion 123 of one or more electric motor modules 120 to an outer mounting surface 113 of the frame housing 110, the space occupied by the motor module within the frame housing is reduced, such that the one or more electric motor modules may be accommodated in a smaller frame housing of a track-type tractor 100. By using a conventional final drive bore 112 and outer mounting surface 113 of a conventional frame housing 110 for mounting the electric motor module 120, use of an existing frame housing in an initial construction or retrofit assembly is enabled, without modification of the frame housing.

In retrofitting an existing work machine 100 to replace an existing mechanical drive system with an electric drive system, as described herein, in an exemplary embodiment, a final drive assembly is disassembled from the frame housing mounting surface 113, and the mechanical drive system is removed from the frame housing 110. The body portion 122 of the motor module housing 121 is inserted in the final drive bore 112, and the flanged end portion 123 is brought into engagement with the frame housing mounting surface 113. The brake assembly 150 is assembled onto the flanged end portion 123 of the motor module housing 121, and the mounting flange 143 of the final drive assembly 140 is assembled onto the brake assembly, such that the rotor shaft 125 engages the gear set 124 within the housing 151 of the brake assembly 150, which makes rotational connection with output shaft 145 in the final drive assembly, which in turn connects with gear set 144. After aligning the mounting holes 116, 126, 146, 156 of the frame housing 110, motor module 120, final drive assembly 140 and brake assembly 150, fastening bolts are installed through the aligned mounting holes. In the illustrated embodiment, the final drive assembly 140 includes a spindle 142 configured to interface with the external brake assembly 150. Accordingly, an electric drive system retrofit kit may include an electric motor module 120, a brake assembly 150, and a final drive assembly 140, and may additionally include longer replacement fastening bolts to accommodate attachment of the motor module, brake assembly, and final drive assembly to the frame housing 110. In other embodiments, the electrical drive system may be configured to accommodate the final drive assembly and/or brake assembly of the existing mechanical drive system, such that a new final drive assembly and/or brake assembly is not needed.

While various inventive aspects, concepts and features of the disclosure may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present disclosure as determined based upon the claims and any equivalents thereof. Still further, while various alternative embodiments as to the various aspects, concepts and features of the disclosure—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present disclosure even if such embodiments are not expressly disclosed herein. Additionally, even though some features, concepts or aspects of the disclosure may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

LIST OF ELEMENTS

100 Track-Type Tractor
105 Track Chain
110 Frame Housing
112 Final Drive Bore
113 Outer Mounting Surface
114 Side of Frame Housing
116 Mounting Holes (Outer Mounting Surface)
120 Electric Motor Module
121 Motor Module Housing
122 Housing Body Portion
123 Flanged End Portion 124 Gear Set
125 Rotor Shaft
126 Mounting Holes (Flanged End Portion)
127 Shoulder Portion
140 Final Drive Assembly
142 Supporting Spindle
143 Mounting Flange
144 Gear Set
145 Output Shaft
146 Mounting Holes (Mounting Flange)
147 Sprocket
150 Brake Assembly
151 Brake Assembly Housing

What is claimed is:

1. A track-type tractor comprising:
a frame housing defining an internal cavity extending to a first outer bore;
a first electric motor module comprising a first motor housing having a first flanged end portion, and a first rotor shaft extending through the first flanged end portion, the first flanged end portion being mounted to a first outer mounting surface of the frame housing surrounding the first outer bore such that at least a portion of the first electric motor module extends through the first outer bore and is retained within the internal cavity defined by the frame housing; and
a first final drive assembly mounted to the first flanged end portion of the first electric motor module such that the first final drive assembly is disposed external to the frame housing, the first final drive assembly including a gear set in operative engagement with the first rotor shaft of the first electric motor module for motorized operation of the first final drive assembly.

2. The track-type tractor of claim 1, wherein the first electric motor module is cantilevered within the internal cavity defined by the frame housing.

3. The track-type tractor of claim 1, further comprising a second electric motor module comprising a second motor housing having a second flanged end portion, and a second rotor shaft extending through the second flanged end portion, the second flanged end portion being mounted to a second outer mounting surface of the frame housing surrounding a second outer bore, such that at least a portion of the second electric motor module extends through the second outer bore and is retained within the internal cavity defined by the frame housing; and
a second final drive assembly mounted to the second flanged end portion of the second motor housing of the second electric motor module such that the second final drive assembly is disposed external to the frame housing, the second final drive assembly in operative engagement with the second rotor shaft of the second electric motor module for motorized operation of the second final drive assembly.

4. The track-type tractor of claim 3, wherein each of the first and second electric motor modules is cantilevered to the frame housing such that the first and second electric motor modules are retained within the internal cavity defined by the frame housing.

5. The track-type tractor of claim 1, further comprising a first brake assembly mounted between the first flanged end portion and the first final drive assembly.

6. The track-type tractor of claim 1, wherein the first final drive assembly includes a first mounting flange mounted to the first flanged end portion.

7. The track-type tractor of claim 6, wherein the first outer mounting surface is configured to accommodate direct mounting of the first mounting flange.

8. The track-type tractor of claim 6, further comprising a plurality of mounting fasteners installed through aligned mounting holes in the first outer mounting surface, the first flanged end portion, and the first mounting flange.

9. A method of installing an electric drive system in a frame housing of a track-type tractor, the method comprising:
inserting a first motor housing of a first electric motor module through a first outer bore in the frame housing such that at least a portion of the first motor housing extends into an internal cavity defined by the frame housing, and such that a first portion a first rotor shaft of the first electric motor module extends into the internal cavity and a second portion of the first rotor shaft extends external to the frame housing;
mounting a first flanged end portion of the first motor housing to a first outer mounting surface of the frame housing surrounding the first outer bore; and
mounting a first final drive assembly to the first flanged end portion such that the first final drive assembly is disposed external to the frame housing, wherein the first final drive assembly is in operative engagement with the first rotor shaft for motorized operation of the first final drive assembly.

10. The method of claim 9, wherein mounting the first flanged end portion of the first motor housing to the first outer mounting surface comprises securing the first electric motor module in a cantilevered condition within the internal cavity defined by the frame housing.

11. The method of claim 9, further comprising:
inserting a second motor housing of a second electric motor module through a second outer bore in the frame housing such that at least a portion of the second motor housing extends into the internal cavity defined by the frame housing, and such that a first portion of a second rotor shaft of the second electric motor module extends into the internal cavity and a second portion of the second rotor shaft extends external to the frame housing;
mounting a second flanged end portion of the second motor housing to a second outer mounting surface of the frame housing surrounding the second outer bore; and
mounting a second final drive assembly to the second flanged end portion such that the second final drive assembly is disposed external to the frame housing, wherein the second final drive assembly is in operative engagement with the second rotor shaft for motorized operation of the second final drive assembly.

12. The method of claim 11, wherein mounting the first and second flanged end portions of the first and second motor housings to the first and second outer mounting surfaces comprises securing the first and second electric motor modules in a cantilevered condition within the frame housing internal cavity.

13. The method of claim 9, wherein mounting the first final drive assembly to the first flanged end portion comprises mounting a first brake assembly between the first flanged end portion and the first final drive assembly.

14. The method of claim 9, wherein mounting the first final drive assembly to the first flanged end portion comprises mounting a first mounting flange of the first final drive assembly to the first flanged end portion.

15. The method of claim 14, wherein the first outer mounting surface is configured to accommodate direct mounting of the first mounting flange.

16. The method of claim 9, wherein mounting the first flanged end portion to the first outer mounting surface and mounting the first mounting flange to the first flanged end portion comprises installing a plurality of mounting fasteners through aligned mounting holes in the first outer mounting surface, the first flanged end portion, and the first mounting flange.

17. The method of claim 9, wherein mounting the first final drive assembly to the first flanged end portion comprises engaging the first rotor shaft with a gear set of the first final drive assembly.

18. An electric drive system retrofit kit for a track-type tractor, the retrofit kit comprising:
   an electric motor module comprising a first motor housing having a flanged end portion, and a rotor shaft extending through the flanged end portion, the flanged end portion including a first set of mounting holes disposed around an outer periphery; and
   a final drive assembly including a mounting flange and a gear set, the mounting flange including a second set of mounting holes sized and positioned to align with the first set of mounting holes when the rotor shaft is engaged with the gear set, such that mounting fasteners installed through the aligned first and second sets of mounting holes may be installed in corresponding mounting holes in an exterior wall of the track-type tractor for mounted installation of the electric motor module and the final drive assembly with the track-type tractor.

19. The retrofit kit of claim 18, further comprising a plurality of mounting fasteners sized to be installed through the aligned first and second sets of mounting holes.

20. The retrofit kit of claim 18, further comprising a brake assembly configured to be mounted between the flanged end portion and the mounting flange of the final drive assembly.

* * * * *